United States Patent [19]
Fredrickson

[11] Patent Number: 6,000,052
[45] Date of Patent: Dec. 7, 1999

[54] SIGNAL CONDITIONING SYSTEM FOR CONTROLLING DATA RETRIEVAL CHANNEL CHARACTERISTICS IN WHICH ERRORS IN SAMPLES ARE SEGREGATED BY ASSOCIATION WITH INTENDED SAMPLE VALUES TO CONTROL SELECTED CHARACTERISTICS

[75] Inventor: Lisa Fredrickson, Ojai, Calif.

[73] Assignee: Seagate Technology, Inc., Scotts Valley, Calif.

[21] Appl. No.: 08/930,972

[22] PCT Filed: Jul. 22, 1997

[86] PCT No.: PCT/US97/13105

§ 371 Date: Oct. 7, 1997

§ 102(e) Date: Oct. 7, 1997

[87] PCT Pub. No.: WO98/03967

PCT Pub. Date: Jan. 29, 1998

Related U.S. Application Data

[60] Provisional application No. 60/022,290, Jul. 22, 1996.

[51] Int. Cl.$^6$ ........................................... G06F 11/00
[52] U.S. Cl. ........................... 714/736; 360/65; 360/53; 375/224; 375/345
[58] Field of Search .................... 714/736; 360/65, 360/53, 51; 375/224, 345; 708/316

[56] References Cited

U.S. PATENT DOCUMENTS

| | | | |
|---|---|---|---|
| 5,121,263 | 6/1992 | Kerwin et al. | 360/53 |
| 5,200,963 | 4/1993 | Chau et al. | 714/820 |
| 5,572,558 | 11/1996 | Behrens | 375/376 |
| 5,729,396 | 3/1998 | Dudley et al. | 360/51 |
| 5,754,353 | 5/1998 | Behrens et al. | 360/53 |
| 5,777,911 | 7/1998 | Sherry et al. | 708/316 |
| 5,796,535 | 8/1998 | Tuttle et al. | 360/51 |

*Primary Examiner*—Phung M. Chung
*Assistant Examiner*—David Ton
*Attorney, Agent, or Firm*—Kinney & Lange, P.A.

[57] ABSTRACT

A signal conditioning system for controlling characteristics of an analog signal obtained from magnetically stored data through a data retrieval channel that asymmetrically affects analog signal magnitudes. Errors in samples are segregated by association with intended sample values, and the different segregates are used in selected versions in control loops to control selected characteristics of the analog signal.

5 Claims, 3 Drawing Sheets

SIGNAL CONDITIONING SYSTEM FOR CONTROLLING DATA RETRIEVAL CHANNEL CHARACTERISTICS IN WHICH ERRORS IN SAMPLES ARE SEGREGATED BY ASSOCIATION WITH INTENDED SAMPLE VALUES TO CONTROL SELECTED CHARACTERISTICS

CROSS-REFERENCE TO RELATED APPLICATION

This application is an International 371 of PCT/US97/13105 filed Jul. 22, 1997, this appln also claims priority from Provisional Application No. 60/022,290, filed Jul. 22, 1996.

BACKGROUND OF THE INVENTION

The present invention relates to information storage systems and, more particularly, to control of characteristics of the data retrieval channel through which data is retrieved from storage in such systems.

Digital data magnetic recording systems store digital data by recording same in a moving magnetic media layer using a storage, or "write", electrical current-to-magnetic field transducer, or "head", positioned immediately adjacent thereto. The data is stored or written to the magnetic media by switching the direction of flow in an otherwise substantially constant magnitude write current that is established in coil windings in the write transducer in accordance with the data. Each write current direction transition results in a reversal of the magnetization direction, in that portion of the magnetic media just then passing by the transducer during this directional switching of the current flow, with respect to the magnetization direction in that media induced by the previous in the opposite direction. In one recording scheme, often termed nonreturn-to-zero inverted (NRZI), each magnetization direction reversal occurring over a short portion of the magnetic media moving past the transducer represents a binary number system digit "1", and the lack of any such reversals in that portion represents a binary digit "0".

Recovery of such recorded digital data is accomplished through positioning a retrieval, or "read" magnetic field-to-voltage transducer, (which may be the same as the storage transducer if both of these transducers rely on inductive coupling between the media fields and the transducer) or "head", is positioned to have the magnetic media, containing previously stored data, pass thereby. Such passing by of the media adjacent to the transducer permits the flux accompanying the magnetization reversal regions in that media either to induce a corresponding voltage pulse in forming an analog output read signal for that retrieval transducer or, alternatively, change a transducer circuit parameter to thereby provide such an output signal voltage pulse. In the coding scheme described above, each such voltage pulse in the read transducer output signal due to the reversal of magnetization directions between adjacent media portions is taken to represent a binary digit "1", and the absence of such a pulse in corresponding media portions is taken to represent a binary digit "0".

Digital data magnetic recording systems have used peak detection methods for the detection of such voltage pulses in the retrieved analog signal as the basis for digitizing this signal. Such methods are based on determining which peaks in that signal exceed a selected threshold to determine that a binary digit "1" related pulse occurred in the retrieved signal, and also use the times between those voltage pulses to reconstruct the timing information used in the preceding recording operation in which the data were stored in the magnetic media as described above. The analog retrieved signal is provided to a phase-locked loop forming a controlled oscillator, or a phase-lock oscillator or synchronizer, which produces an output timing signal, or "clock" signal from the positions of the detected peaks in this analog retrieved signal. Absolute time is not used in operating the data retrieval system portion since the speed of the magnetic media varies over time during both the storage operation and the retrieval operation to result in nonuniform time intervals, or nonuniform multiples thereof, occurring between the voltage pulses in the analog retrieved signal.

There is always a desire in magnetic recording systems to devote less of the magnetic media along a track therein to the storage of a bit to thereby permit increasing the density of the bits stored. The use of peak detection places a limit on the density of bits along a track because increasing that density beyond some point will lead to too much intersymbol interference which in turn leads to errors in the recovery of data using such peak detection methods. Because of this limit, recent increases in bit density along a track in a magnetic media have come with the acceptance of a controlled, or known, amount of intersymbol interference which, since known, allows detection of the pulses involved despite this interference. The read transducer analog output signal generated from the binary bits or symbols stored in the magnetic media is sampled with the resulting samples being converted to digital data, and the samples are taken at a rate which leads to more than one sample per pulse rather than the single sample per pulse which would be sufficient for peak detection if sampling was used therewith. Since each individual sample reflects only part of the pulse response, this process used in a system results in referring to such a system as a partial response system.

A digital data magnetic recording system comprises a bandpass data retrieval channel in that it is unable to transmit very low frequencies, and has an upper frequency beyond which its transmission is also quite poor. Although there are a number of possible alternative partial response system arrangements, there is substantial value in matching the partial response spectrum to that expected for the data to be transmitted in the channel. A relatively simple partial response system that does not require transmission at very low frequencies is known as a class 4 partial response system, and is typically used in magnetic digital data recording systems. Such a response is obtained by providing an overall channel and filter response equal to that of the sum of two opposite polarity Nyquist channel impulse responses separated in time by two sample intervals. Such an arrangement will lead to a filter analog output signal from which ideally can be obtained three alternative possible sample values of -1, 0 and 1 for an input signal based on binary recorded data if sampled at appropriate instants. The sequence of resulting samples can be viewed as comprising an interleaving of two subsequences, one formed of the odd numbered samples and the other formed of the even numbered samples, in view of each sample value having contributions from only the currently retrieved stored datum and second preceding datum.

A read transducer analog output signal provided through any kind of a data retrieval channel is subject to containing errors therein as a result due to noise, timing errors, gain errors, signal offset, channel nonlinearities such as asymmetry, and the like encountered in the course of retrieval- Linear equalization is used in such a channel to provide a frequency response suited for a class 4 partial response channel and to counter linear distortions which would otherwise be imposed on the channel output waveform but cannot counter nonlinear distortions. One such nonlinear distortion in a read channel is asymmetry in the channel response to the binary input values of "0" and "1". One typical source of such asymmetry in a read channel occurs with the use of a magnetoresistive transducer in the read head which often provides a different magnitude output when reading a magnetization transition from the magnetic media in going from a first state to an opposite state than when making a transition from an alternative second state to an opposite state.

Feedback control systems are typically used to control the characteristics of data retrieval channels through estimating the errors with respect to desired values in the channel gain, signal offset and sampling timing phase errors and attempting to drive such errors to zero. Such systems which fail to compensate for channel asymmetry either suffer an undesirable introduction of bias in the estimates or an increase the variance of those estimates over what they would be in the absence of such asymmetry. This result can be shown in connection with the data retrieval portion of a magnetic media digital data storage system shown in block diagram form in FIG. 1.

Figure 1:
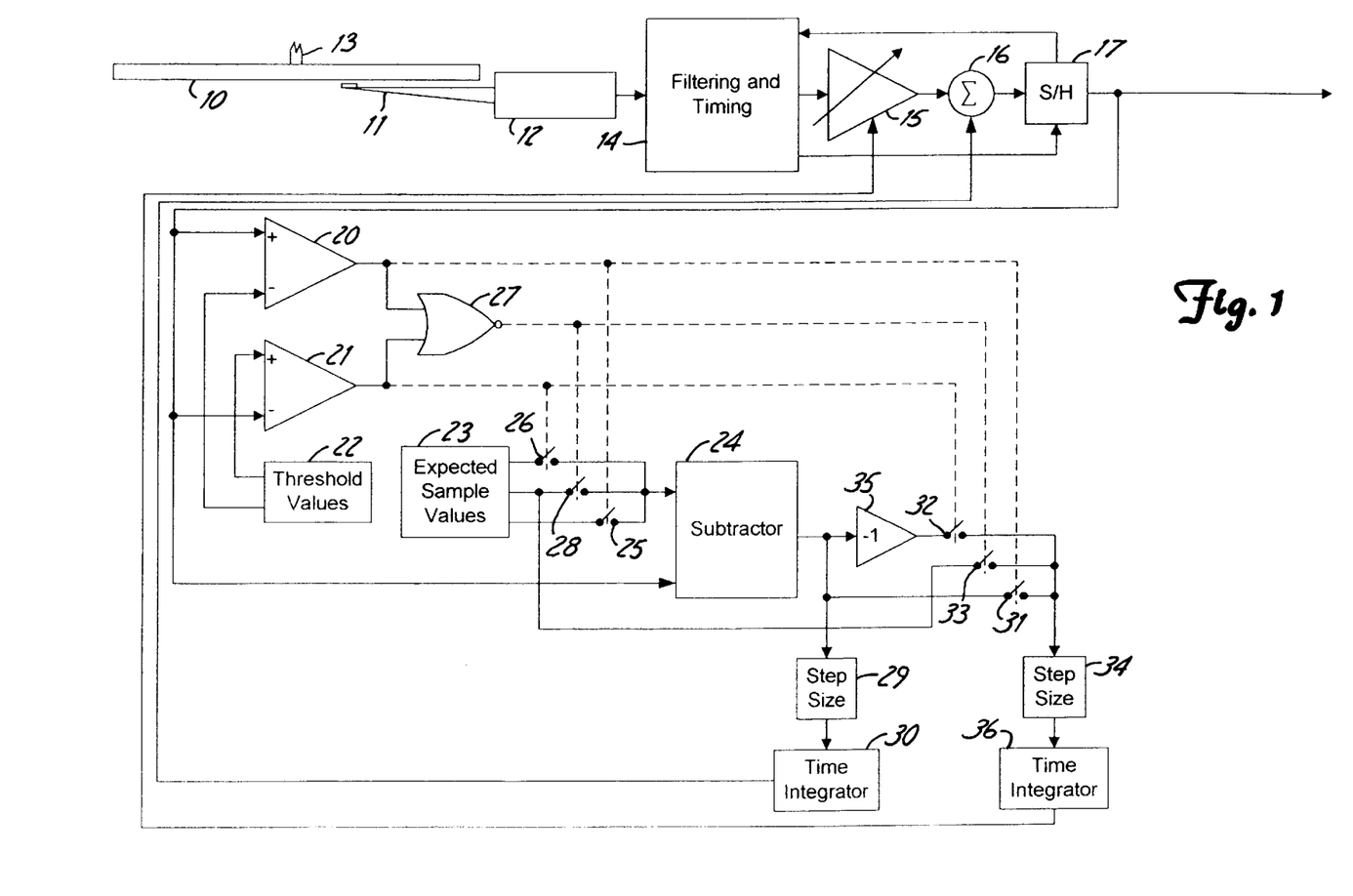
FIG. 1 shows a block diagram of a system used to control characteristics of an analog signal.

In that figure, a magnetic material covered disc, 10, containing pluralities of magnetization direction reversals along each of a plurality of more or less concentric, circular tracks, is rotated past a data retrieval transducer arrangement, 11, or "read head", positioned adjacent a selected track by a "head" positioner and initial signal processor, 12, about a spindle, 13, to provide an initial analog read signal, x(t). This signal is subjected to further processing in a signal processing block, 14, including linear channel equalization. The output from signal processing block 14 is an analog output signal, y(t), which is provided to a variable gain amplifier, 15, and then this signal as amplified, is provided to a signal offset compensation adder, 16. The output of this adder is then provided to a sampler, 17, based on a sample and hold circuit which is operated by a sample acquisition timing signal provided by signal processing block 14 that is derived from the samples provided by sampler 17 to that signal processing block.

Consider the received signal y(t) from the data retrieval channel equalizer in a channel subject to an asymmetry nonlinearity which comes about because of input analog signal x(t), obtained from the data stored in the magnetic media, being introduced into the class 4 partial response channel with a nonlinear element or elements therein. Such a channel output signal can then be approximated to reflect the nonlinearity as $$y(t)=x(t)-c_{asymm}x^2(t).$$

As seen in the system block diagram shown in FIG. 1, this signal is then subjected to a controlled gain in amplifier 15 and to controlled offset compensation in adder 16, and thereafter presented to sampler 17 to be sampled over time in each successive sampling interval T therein to provide samples y(kT) for use in further signal processing steps with k being a counting integer. If the values of the channel input signal x(t) at sampling times kT are written x(kT), the normalized versions thereof are defined as $\hat{x}[k]$ and are expected to take the values 1, 0 or −1 as described above. In the circumstance of the gain being 1 and the offset being 0, the above equation indicates that the samples y[kT] will take the values $1-c_{asymm}$, 0 or $-1-c_{asymm}$ using the normalized values for input signal x(t) at the sampling instants. However, the signal presented to sampler 17 is corrupted by noise present at the sample instants represented by n[kT]. Such noise samples can be considered independent random variables at each sampling instant having a mean value of zero and a variance of $\sigma^2$.

Furthermore, the signal is also corrupted by signal offset acquired in the channel, then amplified in amplifier 15, and subjected to signal offset compensation in adder 16. Assuming that the timing phase errors have been eliminated in block 14, the value of a sample taken at kT will instead of being y[kT], be $$s[kT]=s[k]=\hat{g}[k]\{y(kT)+n(kT)\}+c_{offset}(kT)+\hat{o}[k],$$

where the proper gain $\hat{g}[k]=\hat{g}[kT]$ for the channel and the needed offset compensation $\hat{o}[k]=\hat{o}[kT]$ for the channel are to be estimated.

The error e[k]=e[kT] in this sample is then defined as the difference between the sample magnitude value and the anticipated or expected value for that sample, or $$e[k]=s[k]-p_{\hat{x}[k]}.$$

The expected values of s[k] are, in general, denoted $p_{\hat{x}}[k]$ for a particular value of the input signal and are specifically written as $p_1$, $p_0$ and $p_{-1}$. They can be defined as $p_1 \triangleq$ anticipated value of samples corresponding to $\hat{x}[k]=1$, $p_0 \triangleq$ anticipated value of samples corresponding to $\hat{x}[k]=0$, and $p_{-1} \triangleq$ anticipated value of samples corresponding to $\hat{x}[k]=-1$.

In typical feedback control loops for class 4 partial response data retrieval channels, asymmetry is disregarded and the values for use in those loops are taken as $p_1=1$, $p_0=0$ and $P_{-1}=-1$. In an alternative that provides some recognition of asymmetry, these expected values are taken instead to be $p_1=1$, $p_0=0$ and $p_{-1}=-V_n$ with $V_n$ being a programmable value which is estimated in an external channel assessment arrangement and inserted for use in the control loops by intervention of a microprocessor serving as the overall system controller.

Class 4 partial response data retrieval channels are desirably operated to minimize the mean square error resulting from the error source sought to be controlled. Such an effort requires finding the error gradient of this mean squared error which must be set to zero and solved. The difficulties in finding the minimum mean squared error leads to instead using the error gradient of the squared error itself as a basis for adaptively adjusting the error toward a minimum without having to find a mean value. This results in a stochastic gradient which is used for the adjusting the parameter giving rise to the error or a compensator countering such an error in a direction opposite the error direction in a feedback loop. The stochastic gradient of the squared error with respect to the signal offset estimator ignoring asymmetry is $$\frac{\partial e^2[k]}{\partial \hat{o}[k]} \triangleq \nabla o[k] = 2e[k]\frac{\partial s[k]}{\partial \hat{o}[k]} = 2e[k].$$

Since this gradient is integrated over time and the result multiplied by a small step size factor for loop stability to provide the signal to control an offset compensation adder, the factor 2 can in effect be included in the step size factor. Thus, controlling error due to signal offset is based on a feedback loop forcing the error to zero.

This is accomplished in the system of FIG. 1 by using a pair of comparators, 20 and 21, and a source of threshold values, 22, to determine whether sample values from sampler 17 are likely to have been intended to have a value of 1, 0 or −1, and using that determination to provide an expected value for the corresponding sample from a source, 23, to a subtractor, 24. Each sample form sampler 17 is provided to the non-inverting input of comparator 20, the inverting input of comparator 21, and to one input of subtractor 24. A positive threshold value of one half is provided by source 22 to the inverting input of comparator 20 and a further threshold value of negative one half is supplied by source 22 to the non-inverting input of comparator 21. Samples with values larger than one half cause comparator 20 to switch its output from a "0" logic state value to a "1" logic state value and leave a "0" logic state value at the output of comparator 21. This causes a switch, 25, to close to provide the expected sample value of 1, supplied by source 23, to the input of subtractor 24.

A sample value that is less than negative one half provides the opposite result in logic states at the outputs of comparators 20 and 21. Such a condition instead causes a switch, 26, to close to provide the expected sample value of −1, supplied by source 23, to the input of subtractor 24. If the absolute value of the sample is less than one half, a "0" logic state value appears at the outputs of both of comparators 20 and 21. In this situation only, a NOR gate, 27, having two inputs, each being connected to a corresponding one of the outouts of comparators 20 and 21, will have its output go from a "0" logic state value to a "1" logic state value to thereby close a further switch, 28. This results in the providing the expected sample value of 0, supplied by source 23, to the input of subtractor 24. The expected sample value selected by one of switches 25, 26 and 28 to be provided to one of the inputs of subtractor 24 is subtracted therein from the corresponding sample value in the sequence thereof provided to the other input of that subtractor to yield the corresponding sample error e[k] in the sequence thereof at the subtractor output.

A fractional step size factor is applied in a step size box, 29, to this error as necessary for loop stability and the sequence of errors so formed in this manner is integrated over time in a time integrator, or analog value summer, 30. The output signal of integrator 30 is then supplied to offset compensation adder 16 to act toward cancelling the signal offset in the amplified linear equalizer output signal supplied from signal processing block 14.

The stochastic gradient of the squared error with respect to gain error estimator ignoring asymmetry is $$\frac{\partial e^2[k]}{\partial \hat{g}[k]} \triangleq \nabla g[k] = 2e[k]\frac{\partial s[k]}{\partial \hat{g}[k])} \approx 2e[k]\hat{x}[k]$$

after substituting the expected input signal value at sampling for the actual sample value in the second factor. Again, since this gradient is integrated over time and the result multiplied by a small step size factor for loop stability to provide the signal to control a variable gain amplifier, the factor 2 can in effect be included in the step size factor. Hence, controlling error due to gain variation is based on a feedback loop forcing the product of the error and the expected channel input signal value at sampling instants to zero.

This is accomplished in the system of FIG. 1 by use of a further set of three switches, 31, 32 and 33, to selectively transfer a version of the error provided at the output of subtractor 24 to a further step size block, 34, to apply a fractional step size factor for loop stability. Switch 31 is controlled by the same signal as switch 25, and so transmits the error unchanged if the sample value exceeded one half to thus behave as though transmitting the error multiplied by the expected input signal value at sampling of 1. Similarly, Switch 32 is controlled by the same signal as switch 26, and so permits transmission if the sample value was less than negative one half, but only after the error has passed through an analog inverter, 35, to change its algebraic sign, to thus behave as though transmitting the error multiplied by the expected input signal value at sampling of −1. Finally, switch 33 is controlled by the same signal as switch 28, but transmits the expected value of zero supplied from source 23 if the sample absolute value was less than one half, to thus behave as though transmitting the error multiplied by the expected input signal value at sampling of 0.

The effective error and expected input signal value product signal provided to step size block 34 has a fractional step size applied to it in that block which transmits the result to a time integrator, or analog value summer, 36. The resulting signal is provided to the gain control input of variable gain amplifier 15 to control the amplification of the channel signal supplied to the signal input of amplifier 15 by signal processing block 14.

Although the feedback loops just described in connection with the system of FIG. 1 ignore asymmetry in the design thereof, the asymmetry actually present in the data retrieval channel nevertheless affects the behavior of these loops. As described above, the loops act to force the corresponding gradients to zero resulting, for the signal offset control loop, in having the expected value of the corresponding gradient be zero, or $$E\{\nabla o[k]\} = E\{e[k]\} = 0.$$

If the probability of an input signal value at sampling of 1 is P(1), the probability of an input signal value at sampling of 0 is P(0) and the probability of an input signal value at sampling of −1 is P(−1), this expectation can be written as $$\begin{aligned}E\{e[k]\} &= E\{s[k]_{\hat{x}[k]} - p_{\hat{x}[k]}\}\\ &= E\{(s[k]_{\hat{x}[k]=1} - p_{\hat{x}[k]=1})P(1) +\\ &\quad (s[k]_{\hat{x}[k]=0} - p_{\hat{x}[k]=0})P(0) +\\ &\quad (s[k]_{\hat{x}[k]=-1} - p_{\hat{x}[k]=-1})P(-1)\}\\ &= E\{\{P(1)\{\{\hat{g}[k]\{1 - c_{asymm}) + n[k]\} +\\ &\quad c_{offset}[k] + \hat{o}[k] - 1\}\} +\\ &\quad P(0)\{\{\hat{g}[k]\{0 + n[k]\} + c_{offset}[k] + \hat{o}[k] - 0\}\} +\\ &\quad P(-1)\{\{\hat{g}[k]\{-1 - c_{asymm}) + n[k]\} +\\ &\quad c_{offset}[k] + \hat{o}[k] + 1\}\}\}\}\\ &= E\{\{\hat{g}[k]\{P(1) - P(-1) + [-P(1) - P(-1)]c_{asymm}\} +\\ &\quad [P(1) + P(0) + P(-1)]\hat{g}[k]n[k] +\\ &\quad [P(1) + P(0) + P(-1)]\{c_{offset}[k] + 1\hat{o}[k]\} -\\ &\quad P(1) + P(-1)\}\}.\end{aligned}$$

Since $P(1) = P(-1)$ and $P(1) + P(0) + P(-1) = 1$, $$\begin{aligned}E\{e[k]\} &= E\left\{-\hat{g}[k]\frac{c_{asymm}}{2} + \hat{g}[k]n[k] + c_{offset}[k] + \hat{o}[k]\right\}\\ &= \hat{g}[k]\frac{c_{asymm}}{2} + c_{offset}[k] + \hat{o}[k]\end{aligned}$$

for the noise having a zero mean. Setting this result to zero as indicated above results in showing the offset compensator will introduce into the signal offset compensation loop the value $$\hat{o} \rightarrow \hat{g}[k]\frac{c_{asymm}}{2} - c_{offset}$$

to result in a asymmetry based bias value added in the resulting compensation.

Forcing the gain gradient to zero results in having the expected value of that gradient, in the gain control loop, being zero, or $$E\{\nabla g\} = E\{\hat{x}[k]e[k]\} = 0.$$

This expectation can be written as $$E\{\hat{x}[k]e[k]\} = E\{\hat{x}[k](s[k]_{\hat{x}[k]} - p_{\hat{x}[k]})\}$$
$$= E\{1(s[k]_{\hat{x}[k]=1} - p_{\hat{x}[k]=1})P(1) +$$
$$0(s[k]_{\hat{x}[k]=0} - p_{\hat{x}[k]=0})P(0) -$$
$$1(s[k]_{\hat{x}[k]=-1} - p_{\hat{x}[k]=-1})P(-1)\}$$
$$= E\{\{P(1)\{\{\hat{g}[k]\{1 - c_{asymm}) + n[k]\} +$$
$$c_{offset}[k] + \hat{o}[k] - 1\}\} -$$
$$P(-1)\{\{\hat{g}[k]\{-1 - c_{asymm}) + n[k]\} +$$
$$c_{offset}[k] + \hat{o}[k] + 1\}\}\}\}$$
$$= E\{\{\hat{g}[k]\{P(1) + P(-1) + [-P(1) + P(-1)]c_{asymm}\} +$$
$$[P(1) - P(-1)]\hat{g}[k]n[k] +$$
$$[P(1) - P(-1)]\{c_{offset}[k] + \hat{o}[k]\} -$$
$$P(1) - P(-1)\}\}.$$

Since P(1)=P(−1), $$E\{\hat{x}[k]e[k]\} = \hat{g}[k][P(1)+P(-1)]-P(1)-P(-1).$$

Setting this result to zero as indicated above results in showing the loop forces the gain to a normalized gain value of 1, that is $\hat{g} \rightarrow 1$. Thus, the gain control loop results in an unbiased normalized gain despite the asymmetry present in the data retrieval channel.

However, this asymmetry introduces an increased variance in the gain control loop. Since the expected value of the gain gradient is forced to be zero by the gain control loop, the variance for the gain gradient is $$\text{Var}\{\nabla g\} = E\{(\nabla g - E\{\nabla g\})^2\}$$
$$= E\{(\nabla g - 0)^2\} = E\{(\nabla g)^2\}$$
$$= E\{\{\{1(s[k]_{\hat{x}[k]=1} - p_{\hat{x}[k]=1})\}^2 P(1) +$$
$$\{0(s[k]_{\hat{x}[k]=0} - p_{\hat{x}[k]=0})\}^2 P(0) +$$
$$\{-1(s[k]_{\hat{x}[k]=-1} - p_{\hat{x}[k]=-1})\}^2 P(-1)\}\}$$
$$= E\{\{\{P(1)\{\{\hat{g}[k]\{1 - c_{asymm}) + n[k]\} +$$
$$(c_{offset}[k] + \hat{o}[k] - 1)\}^2 +$$
$$P(-1)\{\{\hat{g}[k]\{-1 - c_{asymm}) + n[k]\} +$$
$$(c_{offset}[k] + \hat{o}[k] + 1)\}^2\}\}.$$

If the gain control loop has forced the normalized gain to 1 and the signal offset control loop has forced the offset compensation to the value given above, this becomes $$\text{Var}\{\nabla g\} = P(1)E\left\{\left(-\frac{c_{asymm}}{2} + n[k]\right)^2\right\} +$$
$$P(-1)E\left\{\left(-\frac{c_{asymm}}{2} + n[k]\right)^2\right\}$$
$$= [P(1) + P(-1)]E\left\{\left(-\frac{c_{asymm}}{2} + n[k]\right)^2\right\}$$
$$= [P(1) + P(-1)]E\left\{\frac{c_{asymm}^2}{4} - n[k]c_{asymm} + n^2[k]\right\}$$

which, for the noise being of zero mean value with a variance of $\sigma^2$, gives $$\text{Var}\{\nabla g\} = [P(1) + P(-1)]\left(\frac{c_{asymm}}{4} + \sigma^2\right).$$

Thus, the presence of a term involving the asymmetry coefficient indicates an increase in the variance of the gain gradient due to asymmetry in the data retrieval channel.

Although the variance due to noise can be halved by using the two most recent gain gradient values in a two point moving average estimate, the asymmetry contribution to the gain gradient variance remains present in a pattern dependent manner. Successive positive and negative valued samples as the basis for the moving average estimate will tend to cancel the asymmetry contribution to the gain gradient variance, but other data patterns will continue to contribute to that variance. Thus, there is a desire for a digital data retrieval channel characteristics control system to provide more nearly optimal channel gain and signal offset performance in the presence of channel asymmetry. Furthermore, there is a desire to provide such a control system in an all, or nearly all, analog form to avoid needing to provide digital registers for this purpose and the corresponding operating delays and increase in power consumption.

BRIEF SUMMARY OF THE INVENTION

The present invention provides a signal conditioning system for controlling characteristics of an analog signal obtained from magnetically stored data through a data retrieval channel that asymmetrically affects analog signal magnitudes, there being a variable gain amplifier and a compensation adder connected series between the channel and a sampler. An expected sample value source provides expected value signals representative of magnitude values in the analog signal is expected to have at least at some of said sampling instants. An error determiner determines differences between the samples taken by the sampler and corresponding ones of the plurality of expected value signals to provide a sequence of error values. An error segregator forms subsequences of the error sequence with at least one subsequence of errors corresponding to those samples which represent magnitudes of the analog signal substantially unaffected by said asymmetry provided at said compensation output thereof, and one or more other subsequences of errors corresponding to those samples which represent magnitudes of said signal substantially affected by said asymmetry. A compensation combiner provides a combination of at least some of the unaffected subsequence of errors to the analog combiner, and a control combiner providing a combination of at least some of the affected subsequence of errors to the variable gain amplifier.

Two subsequences can be formed in the error segregator each corresponding to those samples which represent a corresponding magnitude of the analog signal substantially affected by the asymmetry and then selected versions of those errors in each affected subsequence of errors are combined prior to providing them to the control combiner. An asymmetry combiner combines at least some of the errors in the affected error subsequence and provides the result to the expected sample value source for use in forming expected value signals representative of at least some magnitude values the analog signal.

DETAILED DESCRIPTION OF THE PREFERRED EMBODIMENTS

As previously indicated, the feedback control loops controlling some of the characteristics of the digital data retrieval channel in a magnetic data storage system are operated to be optimal in the sense of minimizing the square of the sample error in a stochastic gradient algorithm based implementation. However, the sample error can be considered as three different errors each associated with one of the expected ideal sample values of 1, 0 and −1 which occur in the channel input signal at the sampling instants. Such error attributions can then be used separately in some combination for controlling the feedback loops. The sample squared error is written generally as $$e^2[k] = (s[k] - p_{\hat{x}[k]})^2$$
$$= \{\hat{g}[k](y[k] + n[k]) + c_{offset} + \hat{o}[k] - p_{\hat{x}[k]}\}^2,$$

and the corresponding squared errors specifically set out for each expected value of the channel input signal at the sampling instants are $$e_1^2[u] = (s[u] - p_1)^2$$
$$= \{\hat{g}[u](1 - c_{asymm} + n[u]) + c_{offset} + \hat{o}[u] - p_1\}^2,$$
$$e_0^2[w] = (s[w] - p_0)^2$$
$$= \{\hat{g}[w]n[w] + c_{offset} + \hat{o}[w] - p_0\}^2$$

and $$e_{-1}^2[v] = (s[v] - p_{-1})^2$$
$$= \{\hat{g}[v](-1 - c_{asymm} + n[v]) + c_{offset} + \hat{o}[v] - p_{-1}\}^2,$$

where u, w and v are counting integers associated with samples corresponding to input signal values of 1, 0 and −1 at the sampling instants, respectively.

A review of the foregoing specific squared errors shows the one associated with the expected ideal sample value of 0, $e_0^2$, involves the signal offset and the signal offset compensation terms but not the asymmetry coefficient.

Thus, the samples associated the expected ideal sample value of zero can be used by themselves to operate the signal offset control loop without introducing bias due to asymmetry. The offset gradient with respect to this squared error for expected sample values of 0 is $$\frac{\partial e_0^2[w]}{\partial \hat{o}[w]} \triangleq \nabla o_o[w] = 2e_o[w]\frac{\partial s[w]}{\partial \hat{o}[w]}$$
$$= 2e_o[w].$$

Thus, the error subsequence developed on the basis of samples occurring for the expected input signal value at sampling being 0 in the sequence of samples can be used to control the signal offset loop by subjecting it to a fractional step size factor chosen for loop stability (in which the factor 2 above is absorbed) and time integrated to provide ô[k] as an unbiased estimate of signal offset. This loop accomplishes this result by forcing this error toward zero to provide $E\{e_0\}=0$. If the mean of the noise is zero, this condition imposed on $e_0$ taken from the above equation for $e_0^2$ gives $\hat{o}[w]=-c_{offset}$.

The remaining two sample squared errors equations above for the expected input signal values at sampling of 1 and −1 involve the corresponding expected sample values $p_1$ and $p_{-1}$ which values can be adjusted in magnitude to counter the asymmetry encountered in the channel. An estimate for the asymmetry is introduced into these squared errors equations for this purpose of compensating for the asymmetry coefficient contribution occurring therein which are the only errors in connection with which the asymmetry occurs in any event. This introduction will have no effect on the signal offset loop performance since it uses only the samples when the expected input signal value at sampling is 0, i.e. the asymmetry coefficient does not appear in the equation for $e_0^2$ nor do $p_1$ and $p_{-1}$ but only $p_0$. The sample squared error value in this situation of jointly using the samples obtained when the expected input signal value at sampling is 1 or −1 becomes $$e_1^2[u] + e_{-1}^2[v] = \{\hat{g}[u, v](1 - c_{asymm} + n[u]) +$$
$$c_{offset} + \hat{o}[u, v] + \hat{c}[u, v] - p_1\}^2 +$$
$$\{\hat{g}[u, v](-1 - c_{asymm} + n[v]) +$$
$$c_{offset} + \hat{o}[u, v] + \hat{c}[u, v] - p_{-1}\}^2.$$

The gain gradient with respect to this sampling error is found as before as $$\frac{\partial(e_1^2[u] + e_{-1}^2[v])}{\partial \hat{g}[u, v]} \triangleq \nabla g_{1,-1}[u, v] = 2(e_1[u] + e_{-1}[v])\frac{\partial(e_1[u] + e_{-1}[v])}{\partial \hat{g}[u, v])}$$
$$\approx 2e_1[u]x[u]_{\hat{x}=1} + 2e_{-1}[v]x[v]_{\hat{x}=1}$$

again substituting the expected input signal value at sampling for the actual sample value in the second factors in each term.

Thus, the error subsequence, developed on the basis of samples occurring for the input signal values at sampling being 1 or −1, has each member thereof in a product with the corresponding input signal value to form a product sequence that is used to control the gain loop by subjecting it to a fractional step size factor chosen for loop stability and then time integrating the result to provide ĝ[u,v] as an unbiased estimate of the gain. This gain control loop accomplishes this result by forcing this product sequence toward zero to provide the operating condition of $E\{e_1[u]x[u]_{\hat{x}}=1+e_{-1}[v]x[v]_{\hat{x}}=-1\}0$. Assuming that the signal offset has been removed by the signal offset loop and generating initial values $p_1=1$ and $P_{-1}=-1$, this condition using $e_1^2$ and $e_1$ obtained from the equation for $e_1^2+e_{-1}^2$ yields $$E\{1[\hat{g}[u,v](1-c_{asymm}+n[u])+\hat{c}[u,v]-1]-1[\hat{g}[u,v](-1-c_{asymm}+n[v])+\hat{c}[u,v]+1]\}=0.$$

This condition shows the loop forces $\hat{g}[u,v]-1$ as desired. Although not calculated here, the gain gradient variance is not increased asymptotically due to asymmetry in this gain control loop.

The asymmetry gradient with respect to the sampling error associated with the expected input signal value at sampling of 1 or –1 is $$\frac{\partial(e_1^2[u]+e_{-1}^2[v])}{\partial \hat{c}[u,v]} \triangleq \nabla c_{1,-1}[u,v] = 2(e_1[u]+e_{-1}[v])\frac{\partial(e_1[u]+e_{-1}[v])}{\partial \hat{c}[u,v])}$$
$$= 2(e_1[u]+2e_{-1}[v]).$$

Thus, the error subsequence developed on the basis of samples occurring for the expected input signal values at sampling being 1 or –1 can be used to control the asymmetry estimation loop by subjecting it to a fractional step size factor chosen for loop stability and then time integrating the result to provide $\hat{c}[u,v]$ as an estimate of the asymmetry to adjust the effective values of $p_1$ and $p_{-1}$.

This asymmetry estimation loop accomplishes this result by forcing this error to zero to provide the operating condition of $E\{e_1[u]+e_{-1}[v]\}=0$. Assuming again that the signal offset has been removed by the signal offset loop and generating initial values $p_1=1$ and $p_{-1}=-1$, this condition yields $$E\{[\hat{g}[u,v](1-c_{asymm}+n[u])+\hat{c}[u,v]-1]+[\hat{g}[u,v](-1-c_{asymm}+n[v])+\hat{c}[u,v]+1]\}=0.$$

This result with the noise having a zero mean value shows that the loop acts to force $\hat{c} \to \hat{g}[u,v]c_{asymm}$ or to $c_{asymm}$ if the gain control loop forces $\hat{g}[u,v] \to 1$.

This arrangement, as can be seen by reviewing the condition equations for the gain control and asymmetry estimation loops, results in the expected sample values for the input signal at the sampling instants being 1 or –1 becoming 1–$\hat{c}$ and –1–$\hat{c}$ rather than being the initially generated values of 1 and –1. That is, rather than having the initially generated values of $p_1=1$ and $p_{-1}=-1$, we instead effectively have $p_1=1-\hat{c}$ and $p_{-1}=-1-\hat{c}$ in completing the asymmetry estimation loop. Thus, implementing the asymmetry loop requires a subtractor in the expected sample values source to subtract the asymmetry estimate from the generated values 1 and –1. A Viterbi detector uses the expected sample values in forming branch metrics, and thus needs to have this asymmetry estimate provided thereto to achieve optimum detection.

If instead of combining the asymmetry estimate directly with the assumed sample values of 1 and –1 corresponding to the expected input signal values at sampling being 1 or –1 in completing the asymmetry estimation loop, an addition to that loop can provide these expected sample values as $$p_1 = \text{MAXIMUM}\{1, 1-2\hat{c}\}$$

and $$p_{-1} = \text{MINIMUM}\{-1, -1-2\hat{c}\}.$$

In the situation in which $c_{asymm}>0$, the error expectation equation above for the asymmetry loop becomes $$E\{[\hat{g}[u,v](1-c_{asymm}+n[u])-1]+[\hat{g}[u,v](-1-c_{asymm}+n[v])-(-1-2\hat{c}[u,v])]\}=0$$

which yields $\hat{c} \to \hat{g}[u,v]c_{asymm}$ thereby providing an unbiased estimate of the asymmetry with an arbitrary gain. The error expectation equation above for the gain control loop becomes $$E\{[\hat{g}[u,v](1-c_{asymm}+n[u])+-1]-1[\hat{g}[u,v](-1-c_{asymm}+n[v])+(-1-2\hat{c}[u,v])]\}=0$$

to yield $\hat{g}[k] \to 1+\hat{c}$ or, using the value for $\hat{c}$ above in this situation, the value for the gain estimate becomes $\hat{g}[k]=1/(1-c_{asymm})$. Thus, there will be sufficient gain applied for the obtained samples intended to have a value of 1 to be at that expected value therefor. On the other hand, the obtained samples intended to have a value of –1 will have a gain applied thereto sufficient to assure that they are of a value more negative than –1 which will have little effect on error rate in a Viterbi detector designed on the basis of the expected of such samples being –1. The corresponding feedback loops do not introduce amplitude modulation, and minimize the variance of the estimates to just that arising from noise without a contribution from asymmetry.

In the alternative situation, $c_{asymm}<0$, and the error expectation equation above for the asymmetry loop becomes $$E\{[\hat{g}[u,v](1-c_{asymm}+n[u])-(1-2\hat{c}[u,v])]+[\hat{g}[u,v](-1-c_{asymm}+n[v])-1]\}=0$$

to again yield $\hat{c} \to \hat{g}[k]c_{asymm}$. The error expectation equation above for the gain control loop becomes $$E\{1[\hat{g}[u,v](1-c_{asymmm}+n[u])+-(1-2\hat{c}[u,v])]-1[\hat{g}[u,v](-1-c_{asymm}+n[v])-1]\}=0$$

to yield $\hat{g}[k] \to 1-\hat{c}$ or, using the value for c above in this situation, the value for the gain estimate becomes $\hat{g}[k]=1/(1+c_{asymm})$. The same beneficial results are found in this asymmetry situation as were found in the previous situation.

Thus, the minimum of the absolute value of the means of the sample value of samples occurring for corresponding input signal values at sampling of 1 or –1 is known because those values have been predetermined to be one. A Viterbi detector to which these samples are provided can thus achieve near optimal performance by relying on the absolute values of the mean sample values being one, in forming the branch metrics therein, without the need for obtaining an asymmetry estimate from the asymmetry feedback loop. This is so since greater absolute values for either of the actual sample means for samples intended to have values of 1 or –1 does not affect the detector error rate very significantly. Forcing the gain to be minimally enough for the mean value of samples intended to have the value of 1 or for the mean value of samples intended to have the value of −1 to reach that value, with only the other reaching beyond its corresponding one of these values, not only allows the Viterbi detector to use both 1 and −1 in forming branch metrics without undue error but also keeps the magnitude range between sample extremes sufficiently small for the analog-to-digital converter used after sampler 17 ahead of the detector.

Figure 2:
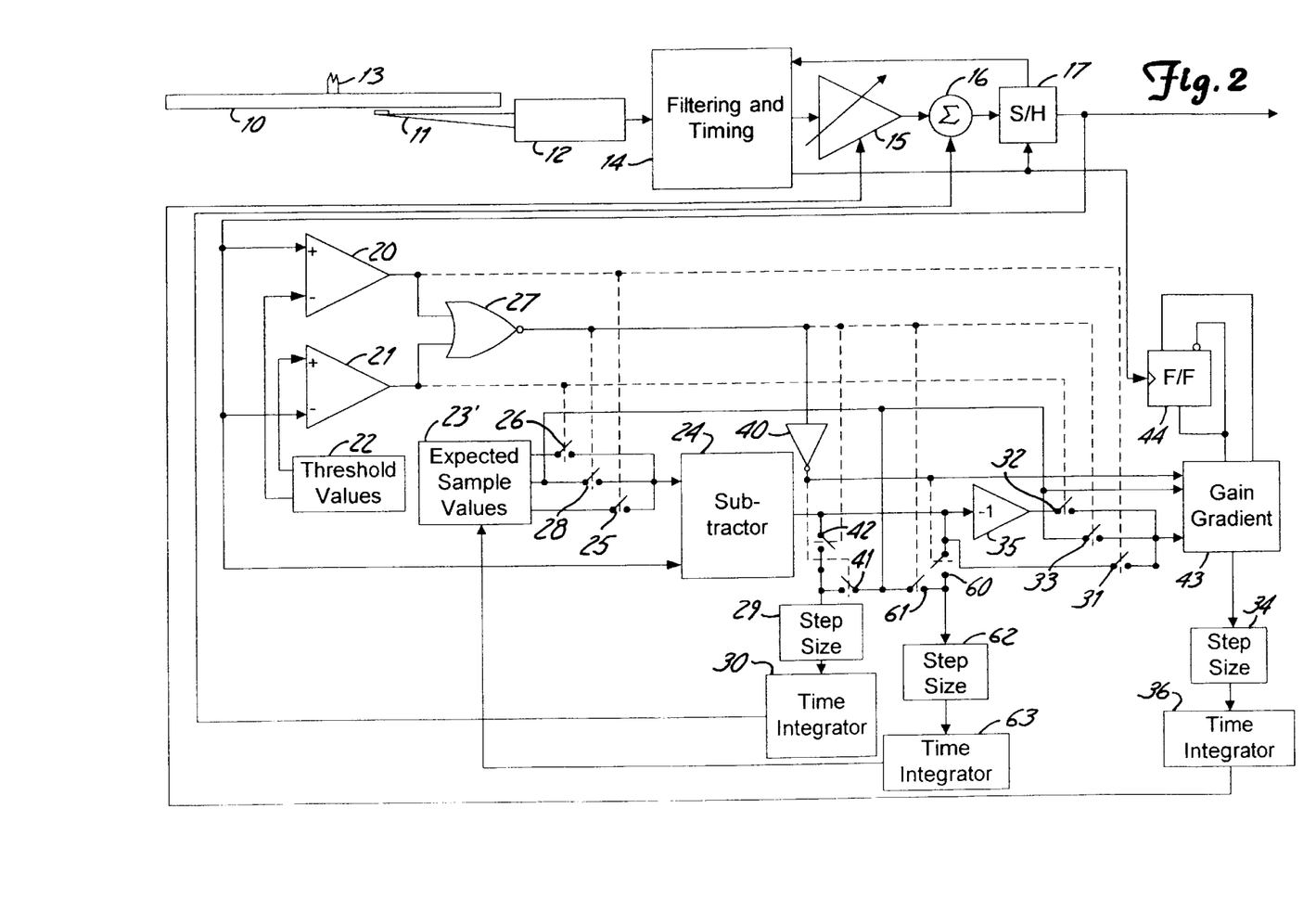
FIG. 2 shows a mixed block and logic diagram of a system used to control characteristics of an analog signal embodying the present invention.

FIG. 2 shows a mixed block and logic diagram of the data retrieval portion of a magnetic media digital data storage system with these above described improved data read channel characteristics control loops implemented in a selected manner therein for a channel exhibiting asymmetry in affecting the magnitudes of the input signal. Portions of the system shown in FIG. 2 correspond to the system shown in the block diagram of FIG. 1, and those portions retain the same numerical designations in FIG. 2 as were used for them in FIG. 1. Thus, the digital data retrieval or read channel portion from FIG. 1 beginning at magnetic media disc 10 and continuing through sampler 17 is again present in the system of FIG. 2. In addition, the samples magnitude range classifier providing the basis for determining whether a received sample was intended to have a value of 1,0 or −1, formed by comparators 20, 21, threshold value source 22 and NOR gate 27, is again used.

Also present again in the system of FIG. 2 is the error determiner arrangement involving expected sample value source 23 (modified here as will be described below and therefore now designated 23'), switches 25, 26 and 28, and subtractor 24 at the output of which the sample error sequence is provided. Step size factor applying block 29 and time integrator 30 for the signal offset loop are again present as are step size factor applying block 34 and time integrator 36 for the gain control loop. In addition, the intended sample value multiplier involving switches 31, 32 and 33 along with analog inverter 35 is again used.

A logic inverter, 40, is added at the output of NOR gate 27 to provide an inverted signal that has a "1" logical value whenever the output of gate 27 is a "0" logical value, and vice versa. Thus, the output signal of logical inverter 40 has a "1" logical value whenever a received sample has been determined by the range classifier to have been intended to have other than a zero value. This output signal from logical inverter 40 is used to close a switch, 41, which thus provides a zero value generated by the expected sample value source 23' to fractional step size factor applying block 29 whenever received samples have been determined by the range classifier to have been intended to have values of 1 or −1 while a further switch, 42, is kept open by a logical value of "0" in the output signal of gate 27. Switch 41 is opened by a logical "0" value in the output signal of logical inverter 40 whenever a received sample is determined to have an intended value of zero.

In this last circumstance, the output signal of NOR gate 27 switches to a logical value of "1" which is used to close switch 42 to allow that sample value to reach fractional step size factor applying block 29. In this manner, a subsequence of the error sequence provided at the output of subtractor 24 is provided to block 29. Thus, as indicated above, the feedback control loop for controlling signal offset is now operated by errors determined in subtractor 24 for only received samples which are determined by the range classifier to have an intended value of zero in accord with the offset control loop description above for providing such a loop free of bias due to asymmetry in the read signal received by sampler 17.

The product sequence having its members formed by the errors in he error sequence provided by subtractor 24, as effectively multipled by the intended value of the corresponding sample as determined by the range classifier, is supplied from the alternative outputs of switches 31, 32 and 33 to a gain gradient operation block, 43. In addition, the zero expected sample value is provided by source 23' to gain gradient operation block 43, as is the output signal of logical inverter 40 that, as describe above, takes on a logical value of "1" whenever the intended values of the received samples are found by the range classifier to be 1 or −1.

Further, the system clock provided by signal processing block 14 to initiate the acquisition of the taking of each sample in sampler 17 is also provided to the clock input of a D-type, edge-triggered flip-flop, 44. The negated output of flip-flop 44 is connected in a feedback configuration to the input thereof so that flip-flop 44 provides at each of its outputs a clock signal at half the frequency of the system clock signal with these two flip-flop output signals alternating between logical "1" and "0" values but each having either such value when the other has the opposite value. Thus, the two output signals of flip-flop 44 are such that one provides logical value "1" pulses for the even indexed samples provided by sampler 17 while the other output provides logical value "1" pulses for the odd indexed samples provided by sampler 17. This even clock signal and this odd clock signal are both provided to gain gradient operation block 43.

Figure 3:
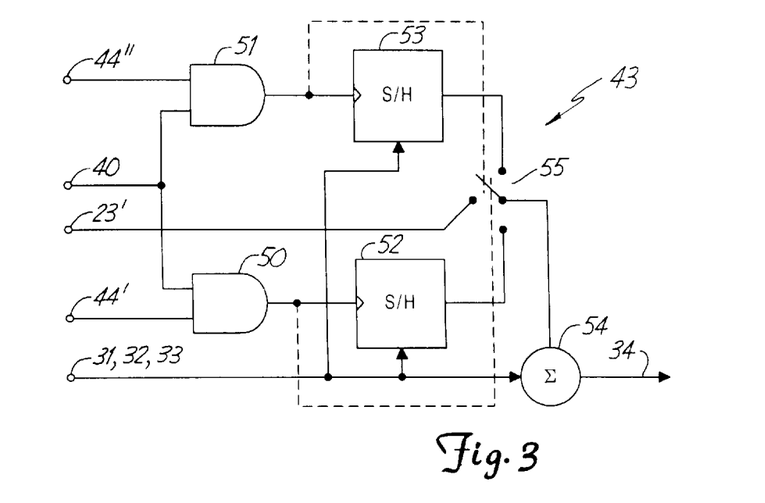
FIG. 3 shows a mixed block and logic diagram of a subsystem used in the system of FIG. 2.

An implementation of gain gradient operation block 43 is shown in the mixed logic and block diagram set out in FIG. 3. The odd clock signal, 44', from flip-flop 44 is provided at the second from the bottom input terminal on the left in FIG. 3 to the input of an AND logic gate, 50. Similarly, the even clock signal, 44", from flip-flop 44 is provided at the upper input terminal on the left in FIG. 3 to the input of a further AND logic gate, 51. Each of the other inputs of AND logic gates 50 and 51 are connected to the second input terminal from the top on the left in FIG. 3 which receives the output signal of logical inverter 40.

As a result, the output of AND logic gate 50 is a logical value of "0" unless the odd clock signal has a logical value of "1" and there has also been received a sample for which the intended value has been determined by the range classifier to equal 1 or −1. In this last circumstance, the output value of logic gate 50 switches to a "1" logic value. Similarly, the output of logic gate 51 has a logic value of "0" unless the even clock signal has a "1" logical value and a received sample has been found to have an intended logic value of either 1 or −1. In this last circumstance, too, the output value of logic gate 51 switches to a logic value of "1".

The output of logic gate 50 is connected to the clocking input of a sample-and-hold circuit, 52, and the output of logic gate 51 is connected to the clocking input of a further sample-and-hold circuit, 53. The signal inputs of both sample-and-hold circuits 52 and 53 are connected to receive the expected sample value and error product subsequence signal provided at the outputs of switches 31, 32 and 33 which signal is also provided to an analog summer, 54. Thus, the value of a product in the sequence thereof of an effective intended sample value and corresponding error from any of switches 31, 32 and 33 for a currently received sample is provided to summer 54 to be added to whatever is provided also to that summer from a switch, 55, with the resulting sum then being sent on to fractional step size of factor applying block 34.

Switch 55 is switched to receive stored product values from sample-and-hold circuit 52 by the same "1" logic value at the output of AND gate 50 that directs sample-and-hold circuit 52 to store a product value. Similarly, switch 55 is switched to receive stored product values from sample-and-hold circuit 53 by the same "1" logic value at the output of AND gate 51 that directs sample-and-hold circuit 53 to store a product value. However, the product values provided for currently received samples are only selectively stored in sample-and-hold circuits 52 and 53, and switch 55 is similarly only selectively connected to the outputs of these circuits. Only those product values are stored in sample-and-hold circuit 52 for received samples which occur when the odd clock has a logical value of "1" and which are determined to be samples that were intended to have a value of either 1 or −1. Similarly, the product values corresponding to the others of such samples found to have those intended values and which occur when the even clock has a logical value of "1" are stored in sample-and-hold circuit 53.

The output of switch 55 is always connected to the middle input terminal of that switch to receive the estimated sample value of zero supplied thereto from the middle operation block input terminal on the left from expected sample value source 23', unless directed to be connected to one of the other two switch input terminals. Because switch 55 is controlled by the output signals of logic gates 50 and 51, switch 55 takes a stored value from one of sample-and-hold circuits 52 and 53 at only those times the next signal is to be stored in that sample-and-hold circuit as determined by its corresponding AND logic gate.

As indicated above, a class 4 partial response digital data retrieval channel can have the sequence of sample values therefrom considered to be an interleaving of the subsequence of even index samples with the subsequence of odd index samples that, when combined together, form the full sequence of data samples. That is, each of these interleave sequences considered alone forms a dicode digital data retrieval channel, and the samples contained in each of the dicode channels that have expected values of either 1 or −1 alternate in algebraic sign in the corresponding subsequence. Since each current nonzero expected sample value and error product value associated with the even clock is added in summer 54 to the previously stored nonzero expected sample value and error product value associated with the even clock which involves an expected value sample of opposite algebraic sign, a two-point moving average of summed pairs of such product values is provided associated with the even clock. A similar two-point moving average of summed pairs of such product values is provided associated with the odd clock. Thus, the output of summer 54 is an interleaving of these even and odd clock associated two-point moving averages.

As a result, the noise in all of the summer 54 output sequence summed pair members is effectively averaged over two product values to reduce the variance of the summer output sequence due to noise by a half. Furthermore, the addition of the two consecutive product values involving samples of opposite algebraic sign results in tending to cancel the asymmetry reflected in those sample values, and in a pattern independent manner. This reduces the variance in the gain gradient estimate due to asymmetry, and so in the gain control loop.

The asymmetry estimate control loop is a further addition in the system of FIG. 2 to that which was shown in the system of FIG. 1. A switch, 60, to control the transmission of the sample error is connected to the output of subtractor 24. A further switch, 61, to control transmission of the expected sample value zero is connected to expected sample value source 23'. Both of switches 60 and 61 are also connected to a fractional step size factor applying box, 62, which in turn provides its output to a time integrator, or analog summer, 63. Switch 60 is controlled by the output signal of logical inverter 40 so that it is closed only when samples currently received have been determined by the range classifier to have an intended value of 1 or −1. Switch 61 is controlled by the signal provided at the output of NOR logic gate 27 and so is closed only when the current sample is determined to have been intended to have a value of zero. Thus, only those sample errors corresponding to received samples that have been determined to be intended to have a value of 1 or −1 are used to form a subsequence of error values that contribute to the estimate of asymmetry provided by this feedback loop. These errors, after having the step size fraction applied thereto in block 62, are provided to integrator 63 the result of which is supplied to expected sample value source 23'.

Figure 4:
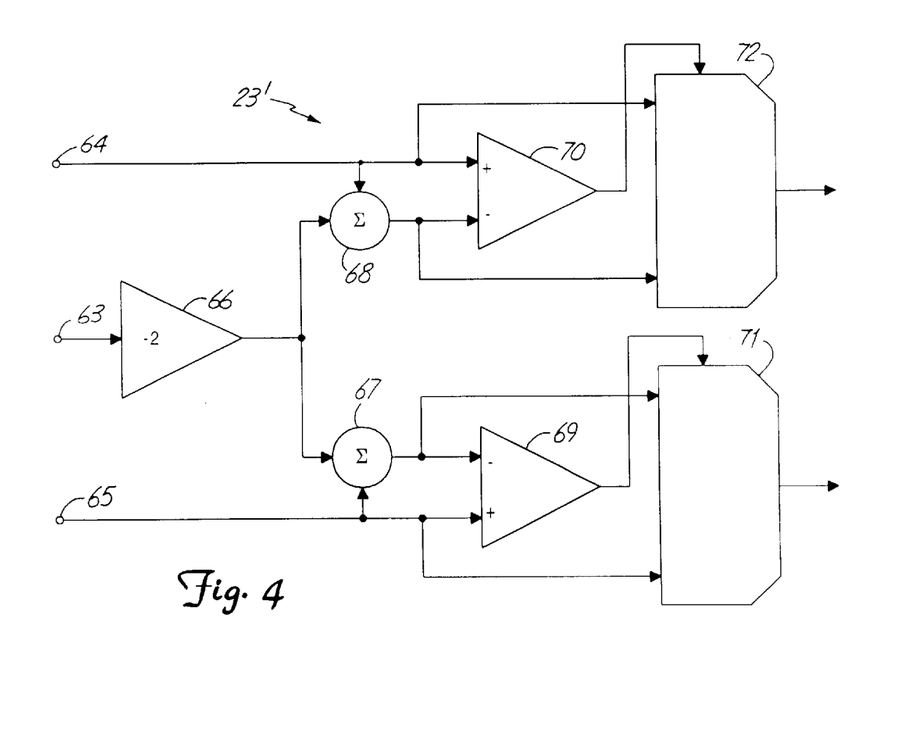
FIG. 4 shows a block diagram of a subsystem used in the system of FIG. 2.

Expected sample value source 23 in FIG. 1 merely generated the expected sample values of 1,0 and −1 expected for the channel input signal at the sampling instants. Those values are still generated in expected sample value source 23' in the system of FIG. 2, and the value zero is used directly in the system of FIG. 2 as described above. However, a further subsystem is added in source 23' in connection with the generation of the expected values for the input signal to the channel at the sampling instants when they are expected to be 1 and −1. This additional subsystem is shown in FIG. 4 where the generated value of 1 is applied to the upper input terminal, 64, on the left. The generated value of −1 is applied to the lower input terminal 65, on the left in that figure. The output of integrator 63 is the asymmetry estimate ĉ which is supplied to the middle input terminal on the left in FIG. 4 which is thereafter multiplied by −2 in an amplifying analog inverter, 66.

The output of inverter 66 is applied to inputs of a pair of summers, 67 and 68. Summer 67 receives −2ĉ from the output of inverter 66 and the value −1 from input terminal 65 to form the combination −1−2ĉ at the output thereof which is supplied to a comparator, 69, at the inverting input thereof. The value −1 from terminal 65 is also applied to the non-inverting input of comparator 69.

The value 1 is supplied from input 64 to another input of summer 68 and combined with the output of inverter 66 to provide the value 1−2ĉ at the output thereof. This value is supplied to the inverting input of a further comparator, 70. The value 1 is supplied from input terminal 64 also to the non-inverting input of comparator 70.

In addition, the value of −1 from terminal 65 is further provided to an input of a multiplexer, 71. The output of summer 67, −1−2ĉ, is also provided to another input of multiplexer 71. Further, the output of comparator 69 is provided to the selector input of multiplexer 71 to determine which of the two signal inputs will be connected to the output thereof. Thus, if −1 exceeds −1−2ĉ, comparator 69 will cause multiplexer 71 to select the input allowing −1−2ĉ to appear at the output thereof. If, on the other hand, −1−2ĉ exceeds the value of −1, comparator 69 will cause selector 71 to select the input allowing −1 to appear at the output thereof.

A similar arrangement is provided in connection with summer 68 and comparator 70. The value 1 from terminal 64 is additionally applied to an input of a further multiplexer, 72, and the output of summer 68 is additionally provided to the other input of that multiplexer. Comparator 70 has the output thereof connected to the selector input of multiplexer 72 to determine which of the two signal inputs will be connected to the output thereof. Hence, should the value 1 exceed the value of 1−2ĉ, comparator 70 will cause selector 72 to connect the input thereof to the output allowing 1 to appear at the output. On the other hand, should 1−2ĉ exceed the value 1, comparator 70 will cause selector 72 to connect the input thereof to its output which allows the value 1−2ĉ to appear at the output.

These results are in accord with the equations above for $p_1$ and $p_{-1}$ set out in connection with the second asymmetry estimating loop described there. This loop uses a selection system to select between the values 1 and 1−2ĉ, and between the values −1 and −1−2ĉ, as described in connection with those equations.

Although the present invention has been described with reference to preferred embodiments, workers skilled in the art will recognize that changes may be made in form and detail without departing from the spirit and scope of the invention.

I claim:

1. A signal conditioning system for controlling characteristics of an analog signal obtained from magnetically stored data through a data retrieval channel asymmetrically affecting magnitudes of said analog signal, said system comprising:

an analog link having an input coupled to said data retrieval channel and a output, said link comprising a variable gain amplifier, having a signal input and an output and having a control input for controlling magnitudes of signals provided at said output thereof which are representative of signals occurring at said input thereof, and an analog combiner, having an output and having both a signal input and a compensation input such that signals occurring on said output thereof are representative of signals occurring on said inputs thereof combined, said variable gain amplifier and analog combiner having said signal inputs and outputs thereof coupled in series with said analog link input and output;

a sampler having an input coupled to said analog link output and an output, said sampler sampling signals occurring at said input thereof at corresponding sampling instants to provide a sequence of samples representative of said signals occurring at said input thereof;

an expected sample value source having a plurality of outputs at each of which an expected value signal is provided representative of a magnitude value said analog signal is expected to have at least at some of said sampling instants to thereby form a plurality of said expected value signals;

an error determiner having a sample input coupled to said sampler output and a value input coupled to said expected sample value source plurality of outputs for determining differences between said samples and corresponding ones of said plurality of expected value signals as a sequence of error values;

an error segregator having an input coupled to said error determiner output and a plurality of outputs including a compensation output and a control output, said error segregator forming subsequences of said error sequence with at least one said subsequence of errors corresponding to those said samples in said sequence thereof which represent magnitudes of said analog signal substantially unaffected by said asymmetry provided at said compensation output thereof and with at least one other said subsequence of errors corresponding to those said samples in said sequence thereof which represent magnitudes of said analog signal substantially affected by said asymmetry provided at said control output thereof;

a compensation combiner having an input coupled to said error segregator compensation output and an output coupled to said analog combiner compensation input, said compensation combiner providing a combination of at least some of said unaffected subsequence of errors at said output thereof; and a control combiner having an input coupled to said error segregator control output and an output coupled to said variable gain amplifier control input, said control combiner providing a combination of at least some of said affected subsequence of errors at said output thereof.

2. The apparatus of claim 1 wherein said error segregator provides two subsequence of errors each corresponding to those said samples in said sequence thereof which represent a corresponding magnitude of said analog signal substantially affected by said asymmetry and combines selected versions of those errors in each affected subsequence of errors prior to providing them at said control output thereof.

3. The apparatus of claim 1 wherein said expected sample value source has an input to receive signals to be used in providing at least at one of said plurality of outputs thereof an expected value signal representative of a magnitude value said analog signal is expected to have at least at some of said sampling instants, and further comprising an asymmetry combiner having an input coupled to said error segregator control output and an output coupled to said expected sample value source input which provides a combination of at least some of said errors in said affected subsequence of errors at said output thereof.

4. The apparatus of claim 3 wherein said expected sample value source combines values received at said input thereof with values available therein to provide a combined signal as said expected value signal.

5. The apparatus of claim 3 wherein said expected sample value source combines values received at said input thereof with values available therein to provide a combined signal and provides as said expected value signal a selected one of said combined signal and other values available therein which is selected based on a relative magnitude relationship therebetween.

* * * * *